United States Patent [19]

Flick

[11] Patent Number: 4,911,390

[45] Date of Patent: Mar. 27, 1990

[54] SUPPORT BRACKET

[76] Inventor: Conrad A. Flick, 3715 1/2 State St., Bettendorf, Iowa 52722

[21] Appl. No.: 221,347

[22] Filed: Jul. 19, 1988

[51] Int. Cl.$^4$ .............................................. F16M 11/00

[52] U.S. Cl. .................................... 248/168; 182/181; 248/188

[58] Field of Search ............ 248/168, 201, 188, 188.6, 248/166, 300; 182/181, 182, 184, 224, 226

[56] References Cited

U.S. PATENT DOCUMENTS

| | | | |
|---|---|---|---|
| 411,725 | 9/1989 | McHemy . | |
| 462,581 | 11/1891 | Peck | 182/182 |
| 1,408,675 | 3/1922 | Wimberg . | |
| 1,672,502 | 6/1928 | Roth | 182/184 X |
| 1,780,579 | 11/1930 | Crowley . | |
| 1,838,151 | 12/1931 | Penote | 182/181 X |
| 1,882,479 | 10/1932 | Brittin | 182/224 |
| 2,105,979 | 1/1938 | Manley | 182/224 |
| 2,477,163 | 12/1952 | Bauett . | |
| 2,742,877 | 4/1956 | Stoner | |
| 2,769,650 | 11/1956 | Larson | 248/188 |
| 3,078,957 | 2/1963 | Larson | 248/188 X |
| 3,175,642 | 3/1965 | Neeley | 182/224 |
| 3,443,662 | 5/1969 | Thompson | 182/181 X |
| 3,445,129 | 5/1969 | Penote . | |
| 4,129,393 | 3/1980 | Sickles . | |
| 4,192,406 | 3/1980 | Mitchell | 182/185 |
| 4,230,416 | 10/1980 | Gilb . | |
| 4,238,001 | 12/1980 | Alexander | 182/181 X |
| 4,256,280 | 3/1981 | McCutchen | 248/220.2 |
| 4,555,887 | 12/1985 | Riorcla et al. . | |

*Primary Examiner*—Ramon S. Britts
*Assistant Examiner*—Karen J. Chotkowski
*Attorney, Agent, or Firm*—Bradford E. Kile

[57] ABSTRACT

The support bracket relates to use in a sawhorse, picnic table, workbench or the like which may be operably and facilely folded for purposes of transportation and/or storage and comprising a generally solid rectangular shell forming a housing with a top surface and four discontinuous side walls. A first socket is fashioned within the housing shell and has a central longitudinal axis extending downwardly from the shell. A second, similar socket is fashioned within the housing shell and includes a central longitudinal axis which forms an acute angle with respect to the central longitudinal axis of the first socket member. A rail slot is fashioned along a top surface of the housing and intimately engages with one end of a two-by-four operable to form a horizontal work surface. A transverse trough is also formed across the top surface of the housing shell and extends perpendicular to the rail slot for operably receiving a two-by-four or the like. The transverse trough selectively supports crossing members to form a table or the like. A third socket is fashioned within the generally rectangular shell housing between the first and second sockets and extends downwardly beneath the rail slot and transverse trough to receive a third leg extending vertically downwardly between the outwardly sloping first and second legs connected to the support bracket.

21 Claims, 4 Drawing Sheets

SUPPORT BRACKET

BACKGROUND OF THE INVENTION

This invention relates to a novel support bracket for a horizontal surface. More specifically this invention relates to a support bracket for a sawhorse, picnic table, workbench, or the like which may be operably and facilely folded for purposes of transportation and/or storage.

The use of sawhorses, stands or benches to facilitate the work of professional and/or amateur carpenters or mechanics has been known for years. Early sawhorses were constructed primarily from wood by an ultimate user. In the relatively recent past, manufactured supports have become commercially available.

In at least one prior embodiment, a first and second generally rectangular collar was designed to operably engage the ends of a pair of two-by-four boards forming angled legs. The end brackets were pivoted together, with a scissor effect, and as the wooden legs were spread, an upper portion of each bracket operably came into contact with a horizontal two-by-four designed to serve as a support element.

In one variation, the collars were provided with apertures to receive fastening screws or the like. These screws were turned tightly into wooden members under axial load to secure the collar to a support leg or horizontal member. In another embodiment cleats, having pointed tips, operably engaged the horizontal member and were forced into the wooden two-by-four as the legs were spread.

In another variation of the above, a truss brace is formed with a pair of opposing end caps encompassing the upper ends of sloping wooden legs. A trough is provided between the sloping end caps and operably receives a horizontal support member. In still another version, a wing nut is mounted beneath a truncated wedge designed to be inserted between outwardly sloping legs. The wing nut serves to draw a horizontal member into supporting engagement with the legs.

Braces of the type outlined above are typically fabricated from sheet metal which is suitable to be bent and folded into an operative brace arrangement. Although devices of this type have received a degree of use, it has been found that certain limitations exist. More specifically, sheet metal truss braces tend to exhibit less than desirable load bearing characteristics. Moreover, insecure engagement of a folding brace with a wooden cross member permits the unit to give and/or collapse unexpectedly. Braces which have been fabricated from sheet metal tend to rust over time which further weakens the structural integrity of the unit. In the past, screw fasteners used with sheet metal braces have been axially loaded and are subject to working loose as wood members swell and contract with variations in ambient moisture and by loading during use. Still further previously known truss braces having outwardly sloping load bearing legs tended to be insecure and "springy" even when properly assembled and sitting on a flat surface. In addition, some prior systems have been somewhat difficult to assemble and in the event a user needs a horizontal work surface a pair of spaced sawhorses are required. Even with spaced sawhorses, however, the upper surface can tip if a user is working off of an end edge of the device. Moreover if a work piece is pulled along an upper support surface, a rear sawhorse of a pair may tip forward.

In other instances, relatively rugged cast iron or steel brackets have been fashioned into a desired configuration and two-by-fours or four-by-fours mounted within the brackets by bolts. These devices tend to be relatively heavy, expensive to manufacture and once constructed, permanent. Such sawhorses or workbenches are not easily moved and can not be compactly stored.

Still further, in many instances, self-made sawhorses, workbenches, picnic tables, etc. have been constructed entirely of wood and are designed for the particular use of the maker. These units tend to be cumbersome, difficult to transport and/or store, time consuming to construct and often are weak at critical joints.

Although previously known sawhorses, workbenches and support structures generally have received considerable use, it would be highly desirable to provide a support bracket for a workbench or the like which would be lightweight, rugged in design, inexpensive to manufacture, and operable to support a wide range of loads. The foregoing should be advantageously achieved with a compact unit which is efficient in design and possesses a high degree of structural integrity and enables a workbench to be folded for transportation and/or storage.

The difficulties and limitations suggested in the preceding are not intended to be exhaustive but rather are among many which may tend to reduce the effectiveness and user satisfaction with prior support brackets for sawhorses, picnic tables, workbenches or the like. Other noteworthy problems may also exist; however, those presented above should be sufficient to demonstrate that support brackets appearing in the past will admit to worthwhile improvement.

OBJECTS AND BRIEF SUMMARY OF THE INVENTION

Objects

It is therefore a general object of the invention to provide a novel, support bracket for a sawhorse, picnic table, workbench or the like which will obviate or minimize problems of the type previously described.

It is a specific object of the invention to provide a novel, support bracket for a sawhorse, picnic table, workbench or the like which will be highly rugged yet light in weight and capable of supporting a wide range of loads in a generally horizontal posture above a ground surface.

It is another object of the invention to provide a novel, support bracket which may be advantageously used to provide a horizontal support surface suitable to be used as a picnic table or workbench which will minimize the number of connecting parts needed to provide a stable, generally horizontal surface.

It is yet another object of the invention to provide a novel support bracket which may be operably connected to wooden legs, such as two-by-fours, or the like, and advantageously fashioned into a horizontal support structure.

It is still another object of the invention to provide a novel support bracket for a sawhorse, picnic table, workbench or the like which may be facilely folded and hung from a peg board surface or double folded for easy storage.

It is a related object of the invention to provide a novel support bracket for a sawhorse, picnic table, workbench or the like which will enable the unit to be folded to permit ease of transportation to or from a job site.

It is a further object of the invention to provide a novel, support bracket for a sawhorse or the like which will be operable to distribute load bearing forces over a wider surface area while concomitantly decreasing the number of support brackets needed to provide a secure horizontal surface.

It is a related object of the invention to provide a novel support bracket for a sawhorse, picnic table, workbench or the like wherein a planar work surface is provided by the use of only one pair of support brackets.

It is still a further object of the invention to provide a novel support bracket for a sawhorse, picnic table, workbench or the like which, although being selectively foldable for storage and portability, is highly secure once erected and does not admit to accidental collapse.

It is still another object of the invention to provide a novel support bracket for a sawhorse, picnic table, workbench or the like wherein efficiency of design enables internal forces to be mutually opposing and offsetting.

It is yet a further related object of the invention to provide a novel support bracket wherein fasteners are not axially loaded to provide load bearing support for a generally horizontal surface.

It is yet a further object of the invention to provide a novel support bracket for a sawhorse, picnic table, workbench or the like which is operable to be utilized with user cut two-by-fours which will provide a stable work surface, with full loading capability, even if a user fails to cut the two-by-fours with exactly square ends.

It is yet another object of the invention to provide a novel support bracket for a picnic table, workbench or the like wherein a work plane will not have a tendency to cant or tip in a manner occasioned when working from separate sawhorses and the like.

BRIEF SUMMARY OF A PREFERRED EMBODIMENT OF THE INVENTION

A preferred embodiment of the invention which is intended to accomplish at least some of the foregoing objects entails a support bracket for a sawhorse, picnic table, workbench or the like comprising a generally solid rectangular shell forming a housing with a top surface and four discontinues side walls. A first socket is fashioned within the housing shell and has a central longitudinal axis extending downwardly from the shell. A second, similar, socket is fashioned within the housing shell and includes a central longitudinal axis which forms an acute angle with respect to the central longitudinal axis of the first socket member. A rail slot is fashioned along a top surface of the housing and intimately engages with one end of a two-by-four operable to form a horizontal work surface. A transverse trough is also formed across the top surface of the housing shell and extends perpendicular to the rail slot for operably receiving a two-by-four or the like. The transverse trough selectively supports crossing members to form a table or the like. A third socket is fashioned within the generally rectangular shell housing between the first and second sockets and extends downwardly beneath the rail slot and transverse trough to receive a third leg extending vertically downwardly between the outwardly sloping first and second legs connected to the support bracket.

THE DRAWINGS

Other objects and advantages of the present invention will become apparent from the following detailed description of a preferred embodiment thereof taken in conjunction with the accompanying drawings, wherein:

FIG. 1 an axonometric view of a support structure formed from a pair of support brackets in accordance with a preferred embodiment of the invention;

FIG. 2 is an axonometric view of support brackets in accordance with the invention, in a partially folded position, operable to be facilely hung upon a peg board or the like for storage;

FIG. 3 a further axonometric view of support brackets in accordance with a preferred embodiment of the invention illustrating the capability of the unit to be double folded into a compact assembly for ease in transportation to and/or from a work site;

FIG. 4 an axonometric detailed view of a support bracket in accordance with the subject invention including an exterior housing or shell in the general configuration of a solid rectangular shell with irregular, but defined, side walls and an upper surface;

Figure 4:
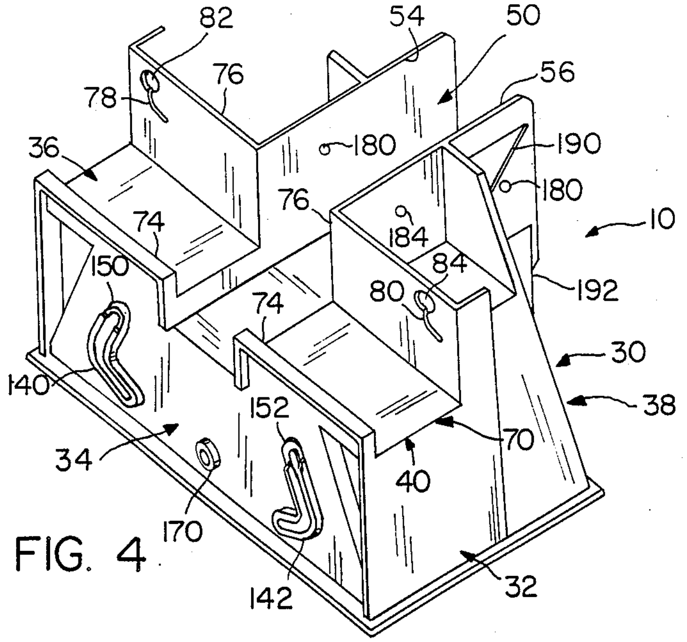
Figure 9:
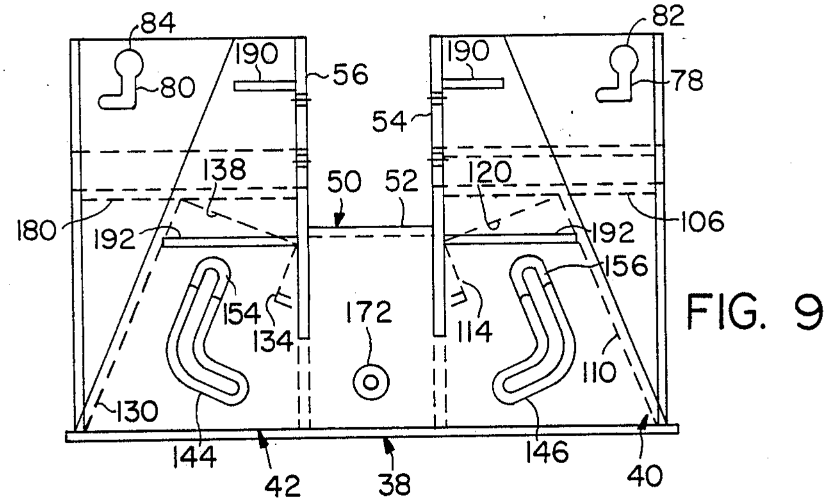
Figure 10:
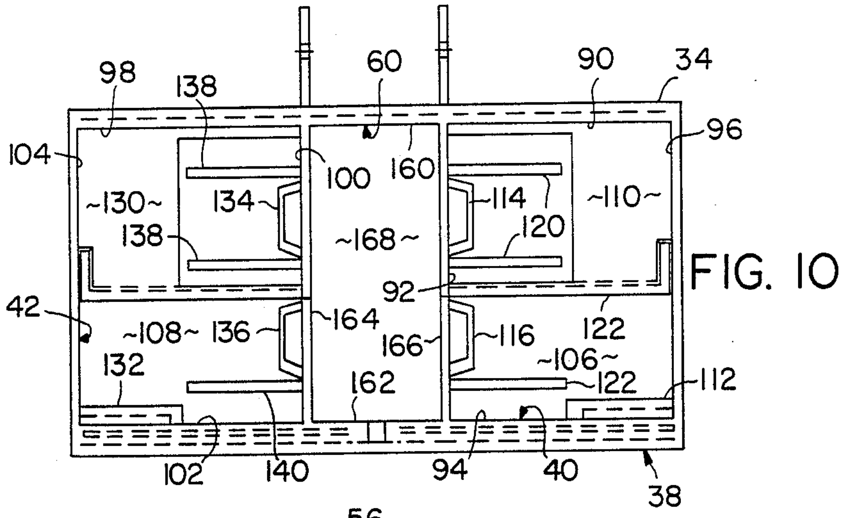

FIG. 9 a back view of the support bracket depicted in FIG. 4;

FIG. 10 a bottom view of the support bracket; and

Figure 11:
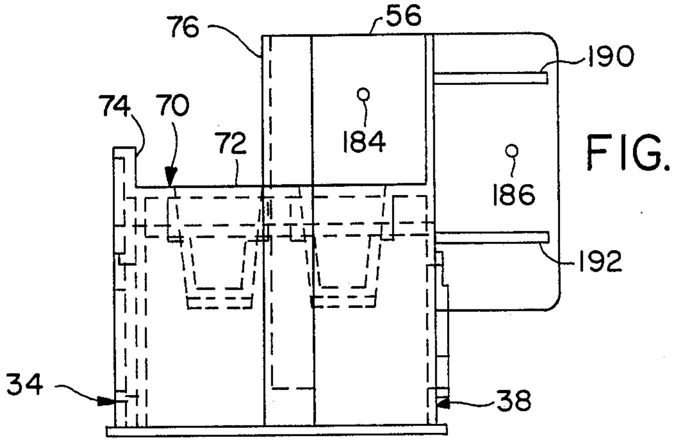

FIG. 11 a side elevational view of the support bracket.

DETAILED DESCRIPTION

Figure 1:
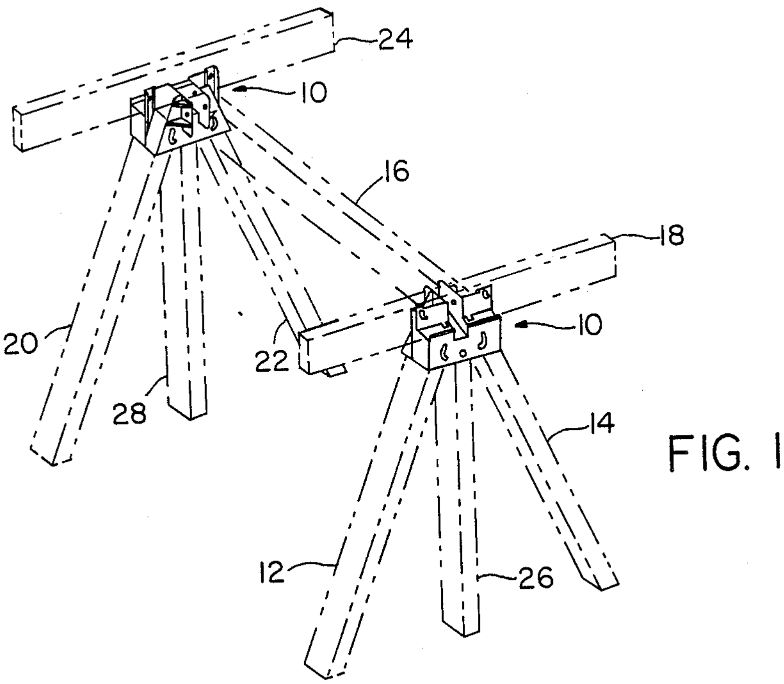

Referring now to the drawings, wherein like numerals indicate like parts, and initially to FIG. 1, there will be seen an axonometric representation of support brackets 10 in accordance with a preferred embodiment of the invention. The support brackets 10 operably cooperate with a first support leg 12 and second support leg 14 to form an initial triangular bearing structure. A first end of a horizontal two-by-four 16 is mounted axially along the top surface of bracket 10 and a transverse table rail 18 is positioned normal to rail 16. The table rail 18 may have an upper surface which is substantially coplanar with rail 16.

A similar arrangement including sloping two-by-four legs 20 and 22 are connected to a second support bracket 10 and a top portion of the second bracket 10 operably receives the other end of generally horizontal rail 16. A transverse member 24, similar to transverse member 18, is mounted upon the second bracket in a posture mutually parallel and coplanar with transverse bracket 18. In cooperation, transverse members 18 and 24 operably define a horizontal bearing surface for application of a table or the like (not shown).

In addition to the outwardly sloping support legs 12-14, and 20-22, the first support bracket 10 operably receives a vertical support leg 26 which is positioned beneath the transverse member 18 and the first end of rail member 16. In a similar manner, a vertical support member 28 is positioned beneath the second bracket 10 and in alignment with the other end of generally horizontal rail 16 and transverse member 24. Accordingly, vertical loading of the generally horizontal surface provided by transverse members 18 and 24, in cooperation with rail 16, is advantageously carried by the vertical support legs 26 and 28 while lateral tipping moments are offset by the sloping support legs 12–14 and 20–22.

The subject support bracket is advantageously fashioned with a plurality of J-shaped slots, to be discussed in detail hereinafter, which receive fastening members which are loaded in shear, and not axial tension, and facilely permit folding of the sloping legs 12–14 and 20–22 into a dangling posture along with vertical legs 26 and 28 respectively. Thus the unit may be mounted upon a peg board surface, not shown, by hanging the transverse rail 16 upon cantilevered peg board brackets, also not shown, but illustratively depicted in FIG. 2.

Figure 3:
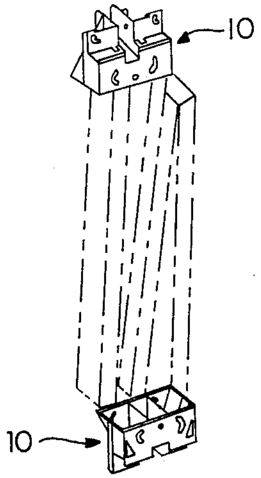

FIG. 3 discloses yet a further advantageous feature of the subject invention wherein the legs 12–14 and 20–22 are retained in a double folded posture wherein the subject support bracket 10 is pivoted about the rail 16 to permit the support structure to be carried to a job site and/or stored in a compact configuration.

Figure 5:
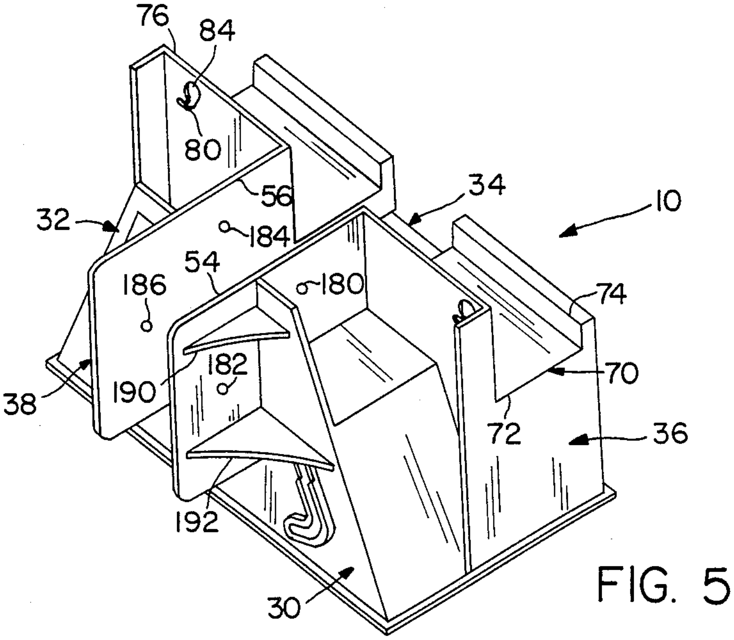
FIG. 5 is an axonometric view similar to FIG. 4 which has been rotated 180 degrees to disclose further details of the bracket.

Turning now to FIGS. 4 and 5, there will be seen detailed axonometric views of a preferred embodiment of the subject support bracket 10. More specifically and with particular reference to FIG. 4, the support bracket 10 for a saw horse, picnic table, workbench or the like is fashioned from a generally solid rectangular housing shell 30 having discontinues lateral wall surfaces 32, 34, 36 and 38. The rectangular housing shell 30 also includes a discontinues top wall surface 40.

FIG. 5 shows the support bracket 10 depicted in FIG. 4; however, this view has been rotated 180 degrees to further disclose structural details of the unit.

Figure 6:
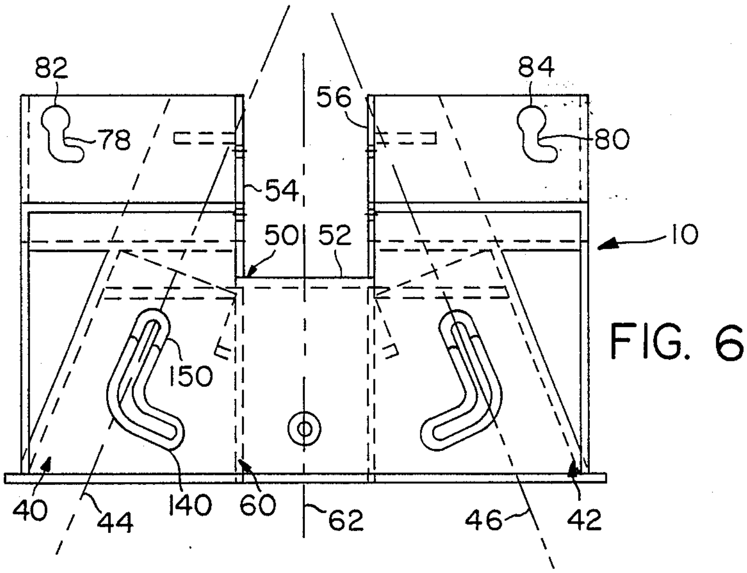
FIG. 6 is a front view of the support bracket depicted in FIG. 4.
Figure 7:
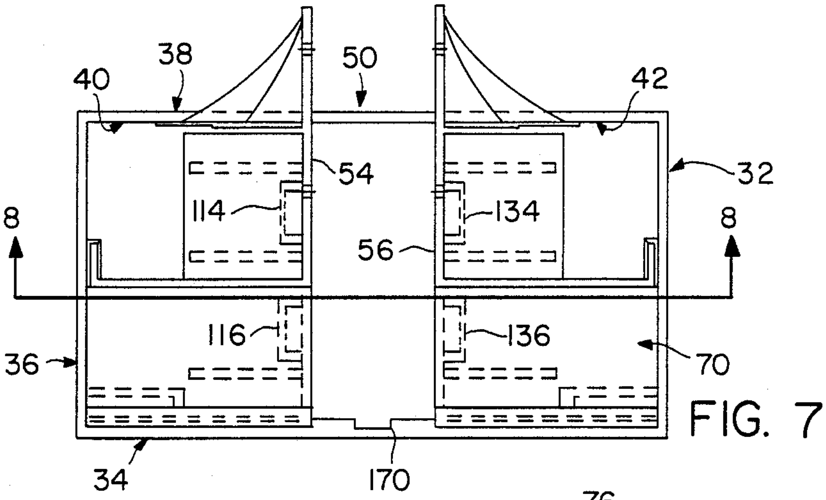
FIG. 7 is a view of the support bracket.
Figure 8:
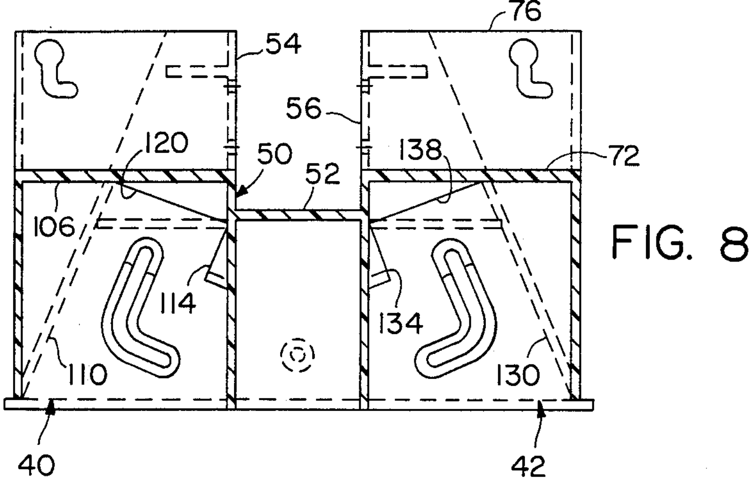
FIG. 8 is a cross-sectional view of the support bracket taken along Section line 8—8 in FIG. 7.

Turning now to FIG. 6, there will be seen a front elevational view of the support bracket 10 in accordance with a preferred embodiment of the invention. The support bracket 10 includes a first socket 40 operably fashioned within the housing shell 30 for receiving an upper portion of a first, compatibly dimensioned support leg 12. This leg may be fabricated from a variety of materials and/or shapes but is preferably a two-by-four wooden member. In a similar manner, the housing 10 is fashioned with a second socket which is operable to receive a second, compatibly dimensioned support leg 14, note again FIG. 1. A central longitudinal axis, depicted by imaginary line 44 in FIG. 6, of he first socket forms an acute angle with respect to a central longitudinal axis of the second socket 42, depicted by imaginary line 46, such that a first leg 12 received within said first socket 40 and a second support leg 14 received within said second socket 42 will mutually slope outwardly with the first and second support legs forming an acute angle therebetween as shown in FIG. 1.

A rail slot 50 is axially formed across the top of the generally rectangular housing shell 30 and extends between said first socket 40 and said second socket 42. The rail includes a generally horizontal bottom surface 52 and mutually parallel side walls 54 and 56 which project upwardly at a right angle with respect to the bottom surface 52. The rail slot 50, in a preferred embodiment, is sized to intimately abut against lateral surfaces of a two-by-four rail member 16 operably connected between a pair of brackets 10.

The third socket 60 is fashioned within the generally rectangular housing shell 30 in a posture between the first socket 40 and second socket 42 and has a central longitudinal axis, depicted by imaginary line 62, which is substantially normal to and beneath the bottom surface 52 of the rail slot 50. The third socket 60 is dimensioned to operably receive a third support leg 26, note again FIG. 1, between the first and second support legs 12 and 14 respectively and extends vertically beneath a generally horizontal support rail 16 positioned within the rail slot 50.

In addition to the rail slot 50, the upper surface of the housing is fashioned with a transverse trough 70 having a generally horizontal bottom surface. 72 and a first normally extending outer or front side wall 74 and a first mutually parallel back wall 76 having a height greater than the height of the front side wall 74.

The transverse trough 70 is operable to receive a transverse table rail 18 in a posture perpendicular to the support rail 16 positioned within the rail slot 50, see again FIG. 1.

The transverse trough 70 includes a pair of J-shaped slots 78 and 80 within the back wall surface 76 and operably engages the head of a fastener, such as a conventional screw, nail, bolt, wing screw or the like connected to a transverse table rail 18. An enlarged top opening 82 and 84 is formed at the top of the J-shaped slots 78 and 80 respectively and operably receives axial passage of the head of a fastening member, not shown, in a conventional manner. The shank of the fastening member is then free to slide along the leg portion of the J-shaped slots 78 and 80 and thereby snuggly, yet releasably, retain the transverse table rail 18 within the trough 70.

Turning now to FIGS. 6–11, the first and second sockets 40 and 42 respectively comprise a generally solid rectangular shell having four lateral wall surfaces 90, 92, 94 and 96 forming the socket 42 and side wall surfaces 98, 100, 102, 104 forming the wall surfaces of the socket 42, note FIG. 10. Each of the sockets 40 and 42 further includes an internal top wall 106 and 108 respectively. Within socket 40, an outer sloping side wall surface 110 and 112 forms a planar area operable for abutting contact with an outside lateral side of a two-by-four and interior sloping surfaces 114 and 116 are provided for intimate abutting contact with an opposite lateral side of the two-by-four. The edges of the two-by-four intimately contact the inside wall surfaces 34 and 38 of the housing shell 3 and abutting end members 120 and 122 which extend normal to the side wall surfaces 110, 112 and 114, note FIGS. 8–10.

In a manner similar to the first socket 40, the second socket 42 is fashioned within the rectangular housing 90 and includes outer sloping side wall surfaces 130 and 132. Opposing sloping surfaces 134 and 136 engage opposing lateral wall surfaces of a second two-by-four and abutting end wall elements 138 and 140 engage an end portion of the second two-by-four leg, note particularly FIGS. 9 and 10.

The wall surfaces 34 and 38 of the housing shell 30 are fashioned with first 140 and second 142 J-shaped slots through wall surface 34 and first 144 and second 146 J-shaped slots through the opposing wall surface 38, note FIG. 9. The front and back wall J-shaped slots each operably receive a fastening member, (not shown) such as a screw, bolt, wing nut screw or the like, to operably secure an end most portion of a first and second support leg within the sockets 40 and 42.

A recessed portion 150 is fashioned within a rim of J-shaped slot 140 and a similar recessed portion 152 is fashioned within the rim of J-shaped slot 142. In a similar manner, recessed portions 154 and 156 are fashioned within J-shaped slot members 144 and 146 respectively.

In each instance, the recessed portion operably receives in abutting contact a portion of the fastening member and when the support legs are in full operative engagement, the recessed portion prevents the fastening members from inadvertently sliding along the guiding path of the J-shaped slot in the event that the support structure is temporarily raised for repositioning or the like.

Figure 2:
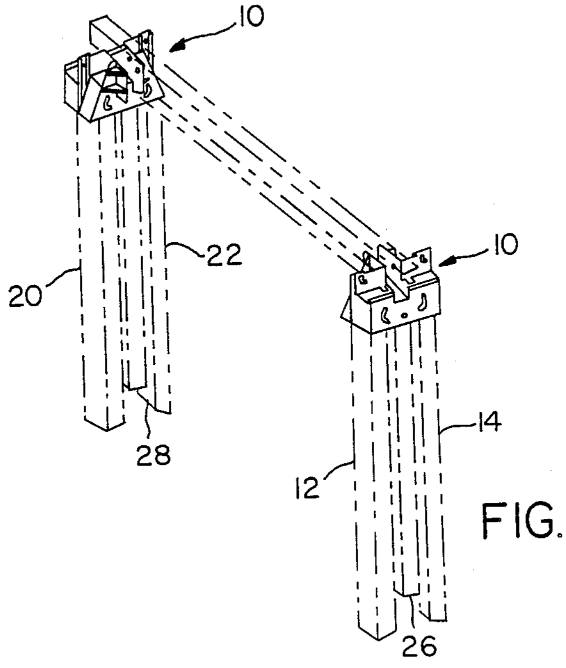

When it is considered desirable to store the unit on a peg board or the like, note again FIG. 2, the threaded fastener is turned counter clockwise until the head can slide out of the depressions 150–156 and along the channel of the J-shaped slot to a lowermost posture. In this condition, the outwardly sloping two-by-four legs 12–22 are free to hang downwardly as depicted in FIG. 2.

The third, vertical, socket 60 is preferably fashioned as a solid rectangular shell having short side walls 160 and 162 and opposing mutually parallel long side walls 164 and 166, note FIG. 10. A top wall is fashioned from a generally planar surface 168 and in combination the wall surfaces are operable to receive the end of a two-by-four or the like in intimate surrounding engagement. In order to secure the two-by-four within the third socket 60, the wall surface 34 of shell 30 is fashioned with an aperture 170 and the back wall surface 38 is fashioned with a similar aperture 172. These apertures operably receive a threaded fastener or the like which extends through the wall surface and into the two-by-four forming a third leg as shown in FIG. 1 as elements 26 and 28.

Referring now specifically to FIGS. 4 and 10, the rail slot 50, having mutually parallel side walls 54 and 56, is formed with a pair of offset side wall apertures 180 and 182 in side wall 54 and corresponding apertures 184 and 186 in side wall 56. These apertures receive threaded fasteners which are operative to secure a generally horizontal support rail within the slot 50 and in the event it is desired to collapse the unit into a double folded posture, note again FIG. 3, the threaded fasteners are withdrawn from apertures 180 and 184 to permit the unit to be pivoted into a folded condition.

In order to stabilize the side walls 54 and 56 of the rail slot 50, a pair of upper and lower gussets 190 and 192 are provided between the back wall 38 of the housing 3 and the side walls 54 and 56 of the rail slot 50.

A support bracket in accordance with a preferred embodiment of the invention may be advantageously injection molded from one of a group of plastic materials including polycarbonates, acrylics, a combination of polycarbonates and acrylics and ultra-high molecular weight polyethylenes. In a preferred embodiment, however, the desired material that is recommended is a polycarbonate.

SUMMARY OF MAJOR ADVANTAGES OF THE INVENTION

After reading and understanding the foregoing description of the invention, in conjunction with the accompanying drawings, it will be appreciated that several distinct advantages of the subject support brackets are obtained.

Without attempting to set forth all of the desirable features of the instant support bracket, at least some of the major advantages of the subject invention include a support bracket that is efficient in design, compact and extremely rugged yet light in weight. The use of vertical center support sockets 60 which operably receive a vertical two-by-four beneath both a rail slot 50 and a transverse trough 70 operably enhances the load bearing characteristics of the unit while permitting laterally angled legs to accommodate tipping tendencies as opposed to providing primary vertical load bearing support.

The provision of a transverse trough 70 across a top surface of the subject support bracket permits a pair of brackets 10 to be used, as illustrated in FIG. 1, to support opposing mutually parallel transverse table rails 18 and 24 and thus provide a horizontal support surface which may be operable as a picnic table, workbench or the like.

The subject support bracket 10 is further fashioned with a plurality of J-shaped slots which permit a transverse member to be selectively added or removed. The J-shaped slots within the front and back wall surfaces 34 and 38 of the housing 30 permit the legs to be selectively folded into a vertical posture for hanging on a wall surface. In a similar manner, the rail slot 50 is provided with a pair of retaining apertures wherein removal of a forward retaining fastener will permit the bracket 10 to pivot with respect to the rail and the legs may be double folded into a parallel posture with respect to a rail for compact storage and/or facile transportation of the unit to or from a work site.

With utilization of all three support leg sockets, the supporting forces may be distributed over three as opposed to two sloping legs thus permitting a wider surface area of ground engaging contact by the support system.

The J-shaped slots and retaining fasteners, in cooperation with the arrangement of the leg receiving sockets, provide for offsetting lateral forces within the unit and load bearing forces are transmitted directly into the sloping side wall surfaces and top abutment members of the bracket as opposed to into the bracket through the fastening members. In other words, the fastening units are not axially loaded to connect the bracket to the support legs and thus are not subject to a tendency to work loose as occasioned in previously known axially loaded retaining members.

The side load bearing characteristics of the subject sockets with a terminal end wall permit the units to be advantageously utilized with two-by-four, or the like, which have been cut at a slight angle and are not absolutely square at the ends.

In describing the invention, reference has been made to a preferred embodiment and illustrative advantages of the invention. Those skilled in the art, however, and familiar with the instant disclosure of the subject invention, may recognize additions, deletions, modifications, substitutions and/or other changes which will fall within the purview of the subject invention and claims.

What is claimed is:

1. A support bracket for a sawhorse, picnic table, workbench or the like comprising:
   - a housing;
   - a first socket fashioned within said housing and being operable to receive a first ground surface engaging support leg in abutting contact with an end surface within said first socket;
   - a second socket fashioned with said housing and being operable to receive a second ground engaging support leg in abutting contact within an end surface within said second socket;

a central longitudinal axis of said first socket forming an acute angle with respect to a central longitudinal axis of said second pocket such that a first ground surface engaging support leg is received within said first socket and a second ground surface engaging support leg received within said second socket will mutually slope outwardly with the first and second ground surface engaging support legs forming an acute angle therebetween;

a rail slot extending axially across an upper portion of said housing and between said first socket and said second socket, said rail slot being operable to receive a generally horizontal support rail; and a third socket fashioned within said housing in a posture between said first socket and said second socket and having a central longitudinal axis substantially normal to and beneath a bottom surface of said rail slot, said third socket being operable to receive a third ground surface engaging support leg in abutting contact with an end surface within said third socket the third support leg being between said first and second support legs and extending vertically beneath a generally horizontal support rail positioned within said rail slot for primary load bearing support of the horizontal support said with respect to a ground surface.

2. A support bracket for a sawhorse, picnic table, workbench or the like comprising:

a housing fashioned from a generally solid, rectangular shell having discontinues lateral wall surfaces and top wall surfaces;

a first socket fashioned within said housing and being operable to receive a first support leg;

a second socket fashioned within said housing and being operable to receive a second support leg;

a central longitudinal axis of said first socket forming an acute angle with respect to a central longitudinal axis of said second socket such that a first support leg received within said first socket and a second support leg received within said second socket will mutually slope outwardly with the first and second support legs forming an acute angle there between;

a rail slot extending axially across the said top wall surface of said housing and between said first socket and said second socket, said rail slot being operable to receive a generally horizontal support rail; and a transverse trough extending perpendicular to said rail slot lonigtudinally across the top of said housing and being operable to receive a transverse table rail perpendicular to a support rail ;positioned within said rail slot, said transverse trough including lateral, generally vertical sidewall surfaces and at least one aperture fashioned through at least one of said generally vertical side wall surfaces for operably receiving an engaging portion of a fastener connected to a generally transverse table rail for releasably connecting a table rail to said support bracket, said transverse trough having first and second spaced but coplanar load bearing and generally rectangular trough surfaces transversely extending along and integrally joined between said lateral, generally vertical sidewall surfaces for providing an extended planar bearing area laterally supported along said generally vertical sidewall surfaces for receiving a transverse table rail being raised with respect to a base portion of said rail slot and an inner generally vertical sidewall surface of said trough generally vertical being substantially coplanar with an inner wall surface of each of said first and second sockets.

3. A support bracket for a saw horse, picnic table, workbench or the like comprising:

a housing composed of a generally solid rectangular shell having discontinues lateral wall surfaces and a top wall surface;

a first socket fashioned with said housing and being operable to receive a first support leg;

a second socket fashioned within said housing and being operable to receive a second support leg;

a central longitudinal axis of said first socket forming an acute angle with respect to a central longitudinal axis of said second socket such that a first support leg received within said first socket and a second support leg received within said second socket will mutually slope outwardly with a first and second support legs forming an acute angle there between;

a rail slot extending axially across the top portion of said housing and between said first socket and said second socket, said rail housing being operable to receive a generally horizontal support rail;

a transverse trough extending perpendicular to said rail slot and longitudinally across a top portion of said housing and being operable to receive a transverse table rail perpendicular to a support rail positioned with said rail slot; and a third socket fashioned within said housing in a posture between said first socket and said second socket and having a central longitudinal axis substantially normal to and beneath a bottom surface of said rail slot and said transverse trough, said third socket having interior means for operably receiving in abutting contact a third support leg between said first and second support legs said third support leg extending vertically beneath a generally horizontal support rail positioned within said rail slot and a transverse table rail positioned within said transverse trough, wherein said first, second and third support legs are each operable to engage and supportingly contact a ground surface.

4. A support bracket for a sawhorse, picnic table, workbench or the like comprising:

a housing;

first socket fashioned within said housing and being operable to receive a first support leg;

a second socket fashioned with said housing and being operable to receive a second support leg;

a central longitudinal axis of said first socket formig an acute angle with respect to a central longitudinal axis of said second socket such that a first support leg received within said first socket and a second support leg received within said second socket will mutually slope outwardly with the first and second support legs forming an acute angle there between;

a rail slot extending axially across an upper portion of said housing and between said first socket and said second socket, said rail slot being operable to receive a generally horizontal support rail;

a third socket fashioned within said housing in a posture between said first socket and said second socket and having a central longitudinal axis substantially normal to and beneath a bottom surface of said rail slot, said third socket being operable to receive a third support leg between said first and second support legs extending vertically beneath a generally horizontal support rail positioned within said rail slot;

said first and second sockets each comprise, a generally solid rectangular shell having four lateral wall surfaces and a top surface, opposing lateral wall surfaces of said generally solid rectangular shell having sloping side surfaces for contacting opposing surfaces of a support leg and abutting end members angularly positioned within the top of said sockets and normal to said opposing sloping side surfaces of said sockets; and at least one wall surface between said opposing lateral wall surfaces of said sockets being fashioned with a generally J-shaped slot and being positioned such that a long leg of said J-shaped slot is an alignment with the central longitudinal axis of said socket wherein said J-shaped slot operably serves to receive a fastening member extending through said wall surface and into an associated support leg wherein a support leg may be retained in a secure operative angular posture and selectively disengaged and allowed to collapse into a generally vertical position for storage.

5. A support bracket for a sawhorse, picnic table, workbench or the like comprising:

a housing fashioned from a generally solid, rectangular shell having discontinues lateral wall surfaces and top wall surfaces;

a first socket fashioned within sail housing and being operable to receive a first support leg;

a second socket fashioned within said housing and being operable to receive a second support leg;

a central longitudinal axis of said first socket forming an acute angle with respect to a control longitudinal axis of said second socket such that a first support leg received within said first socket and a second support leg received within said second socket will mutually slope outwardly with the first and second support legs forming an acute angle there between;

a rail slot extending axially across the said top wall surface of said housing and between said first socket and said second socket, said rail slot being operable to receive a generally horizontal support rail;

a transverse trough extending perpendicular to said rail slot lonigtudinally across the top of said housing and being operable t receive a transverse table rail perpendicular to a support rail positioned within said rail slot;

said first and second sockets each comprises, a generally solid rectangular shell having four lateral wall surfaces and a top surface, opposing lateral wall surfaces of said generally solid rectangular shell having sloping side surfaces for contacting opposing surfaces of a support leg and abutting end members angularly positioned within the top of said sockets and normal to said sloping side surfaces of said sockets; and opposing wall surfaces, between said opposing lateral wall surfaces, of said first and second sockets each being fashioned with a generally J-shaped slot and being positioned such that a long leg of said J-shaped slots are in alignment with the central longitudinal axis of said sockets within said J-shaped slots oeprably serve to receive fastening members extending through said wall surfaces and into opposing sides of a support leg wherein a support leg to be retained in a secure, operative angular posture and selectively disengaged and allowed to collapse into a generally vertical position for its storage.

6. A support bracket for a saw horse, picnic table, workbench or the like comprising:

a housing composed of a generally solid rectangular shell having discontinues lateral wall surfaces and a top wall sirface;

a first socket fashioned with said housing and being operable to receive a first support leg;

a second socket fashioned within said housing and being operable to receive a second support leg;

a central longitudinal axis of said first socket forming an acute angle with respect to a central longitudinal axis of said second socket such that a first support leg received within said first socket and a second support leg received within said second socket will mutually slope outwardly with a first and second support legs forming an acute angle there between;

a rail slot extending axially across the top portion of said housing and between said first socket and said second socket, said rail housing being operable to receive a gemerally horizontal support rail;

a transverse trough extending perpendicular to said rail slot, longitudinally across a top portion of said housing and being operable to receive a transverse table rail perpendicular to a support rail positioned within said rail slot;

a third socket fashioned within said housing in a posture between said first socket and said second socket and having a central longitudinal axis substantially normal to and beneath a bottom surface of said rail slot, and said transverse trough, said third socket being operable to receive a third support leg between said first and second support legs extending vertically beneath a generally horizontal support rail positioned within said rail slot and a transverse table positioned within said transverse trough; and said first and second sockets each comprise, a generally solid rectangular shell having four lateral wall surfaces and a top surface, opposing lateral wall surfaces of said generally solid rectangular shell having sloping side surfaces for contacting opposing surfaces of a support leg and abutting end members angularly positioned within the top of said sockets and normal to said sloping side surfaces of said sockets; and opposing wall surfaces between said opposing lateral wall surfaces of said sockets being fashioned with a generally J-shaped slot and being positioned such that a long leg of said J-shaped slot is in alignment with the central longitudinal axis of said socket wherein said J-shaped slot operably serves to receive a fastening member extending through opposing wall surfaces and into an associated support leg wherein a support leg may be retained in a secure operative angular posture and selectively disengaged and allowed to collapse into a generally vertical position for storage.

7. A support bracket as defined in claim 1 further comprising:

a transverse trough extending perpendicular to said rail slot longitudinally across an upper portion of said housing and being operable to receive a transverse table rail perpendicular to a support rail positioned within said rail slot.

8. A support bracket as defined in claim 7 wherein: said transverse trough includes lateral, generally vertical sidewall surfaces and at least one J-shaped slot fashioned through at least one of said generally vertical side wall surfaces for operably receiving an engaging portion of a fastener connected to a generally transverse table- rail releasably connecting a table rail to said support bracket.

9. A support bracket as defined in claim 1 wherein said first and second sockets each comprise:

a generally solid rectangular shell having four lateral wall surfaces and a top surface, opposing lateral wall surfaces of said generally solid rectangular shell having sloping side surfaces for contacting opposing surfaces of a support leg and abutting end members angularly positioned within the top of said sockets and normal to said opposing sloping side surfaces of said sockets.

10. A support bracket as defined in claim 4 wherein: each of said J-shaped slots each include a peripheral lip around the slot and a recess portion at a distal end of the long-leg pof said J-shaped slot for receiving a fastening member in a secure manner to prevent unanticipated movement of a support leg as guided by a fastening member extending through said J-shaped slot.

11. A support bracket as defined in claim 9 wherein said third socket comprises:

a shell of a generally solid rectangular shell and having a central longitudinal axis extending normal to said rail slot extending axially across an upper portion of said housing wherein a support leg positioned within said third socket extends directly beneath and normal to a generally horizontal support rail positioned within said rail slot for providing enhanced load bearing capacity for said generally horizontal support rail.

12. A support bracket as defined in claim 11 and further comprising:

at least one retaining aperture fashioned through a lateral wall surface of said third socket and being operable to receive a connecting member for releasably retaining a support leg within said third socket.

13. A support bracket as defined in claim 1 wherein said housing comprises:

a generally solid rectangular shell having discontinues lateral wall surfaces and top wall surfaces and a generally open bottom portion defining the openings for said first, said second, and said third sockets and a peripheral rim extending completely about the bottom most portions of the sidewalls of said generally solid rectangular shell to provide strengthening of said housing at a location defining the opening of said first, second and third sockets for receiving support legs.

14. A support bracket as defined in claim 7 wherein said rail slot comprises:

a generally rectangular slot having a substantially horizontal bottom surface projecting across said housing and through said transverse trough and normally extending mutually parallel side walls operable to receive in abutting engagement a support rail having a generally rectangular cross section; and at least one of said mutually parallel side walls having at least two retaining apertures each for receiving a retaining member through the side wall and into an associated horizontal support rail positioned within said rail slot.

15. A support bracket as defined in claim 2 wherein said first and second sockets each comprise:

a generally solid rectangular shell having four lateral wall surfaces and a top surface, opposing lateral wall surfaces of said generally solid rectangular shell having sloping side surfaces for contacting opposing surfaces of a support leg and abutting end members angularly positioned within the top of said sockets and normal to said sloping side surfaces of said sockets.

16. A support bracket as defined in claim 5 wherein: each of said J-shaped slots includes a peripheral lip around the slot and a recess portion at a distal end of a long leg of said J-shaped slot for receiving a fastening member in a secure manner to prevent unanticipated movement of a support leg as guided by a fastening member extending through said J-shaped slot.

17. A support bracket as defined in claim 15 or claim 5 wherein:

said transverse trough including lateral, generally vertical sidewall surfaces and at least one J-shaped slot fashioned through at least one of said generally vertical sidewall surfaces for operably receiving an engaging portion of a fastener connected to a generally transverse table rail for releasably connecting a table rail to said support bracket.

18. A support bracket as defined in claim 15 or claim 5 wherein said transverse trough comprises:

a generally planar bottom surface and a pair of generally vertical side wall surfaces wherein an outer side wall surface has a height less than the height of an inner side wall surface.

19. A support bracket as defined in claim 18 and further comprising:

a pair of J-shaped slots with enlarged top opening fashioned through the highest side wall of said transverse table trough and operably receiving engaging portions of fasteners connected to a generally transverse table rail for releasably connecting a table rail to said support bracket.

20. A support bracket as defined in claim 6 wherein said transverse trough comprises a generally horizontal bottom surface and mutually parallel and opposing side wall surfaces wherein an outward sidewall surface is shorter in height than an opposing back side wall surface and a pair of J-shaped slots extend through the higher backwall surface each for operably receiving an engaging portion of a fastener connected to a generally transverse table rail for releasably connecting a table rail to said support bracket.

21. A support bracket as defined in claim 20 wherein said rail slot comprises:

a generally rectangular slot having substantially horizontal bottom surface across the top of said housing and normally extending, mutually parallel side walls operable to receive an abutting engagement, a support rail having a generally rectangular cross-section; and each of said mutually parallel side walls having at least two retaining apertures each for receiving a retaining member through the side wall and into an associated horizontal support rail positioned within said rail slot.

* * * * *